United States Patent
Li et al.

(10) Patent No.: US 10,075,308 B2
(45) Date of Patent: Sep. 11, 2018

(54) SUPPLY VOLTAGE ADAPTATION VIA DECISION FEEDBACK EQUALIZER

(71) Applicant: Intel Corporation, Santa Clara, CA (US)

(72) Inventors: Shenggao Li, Pleasanton, CA (US); Ji Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,603

(22) Filed: Sep. 30, 2016

(65) Prior Publication Data

US 2018/0097665 A1     Apr. 5, 2018

(51) Int. Cl.
*H04L 27/10* (2006.01)
*H04L 25/03* (2006.01)
*H04L 29/06* (2006.01)

(52) U.S. Cl.
CPC ........ *H04L 25/03057* (2013.01); *H04L 69/28* (2013.01)

(58) Field of Classification Search
CPC .......................... H04L 25/03057; H04L 69/28
USPC .................................. 375/232, 233; 327/117
See application file for complete search history.

(56) References Cited

U.S. PATENT DOCUMENTS

| | | | |
|---|---|---|---|
| 7,218,699 B2 * | 5/2007 | De Gouy | H03K 23/544 327/117 |
| 9,438,450 B1 | 9/2016 | Kang et al. | |
| 2013/0243071 A1 * | 9/2013 | Chmelar | H04L 25/063 375/233 |
| 2015/0256160 A1 | 9/2015 | Bulzacchelli et al. | |
| 2016/0087817 A1 | 3/2016 | Huang et al. | |
| 2016/0233867 A1 | 8/2016 | Tamura | |

FOREIGN PATENT DOCUMENTS

| | | |
|---|---|---|
| KR | 1020110037926 A | 4/2011 |
| WO | WO-2018063732 A1 | 4/2018 |

OTHER PUBLICATIONS

"International Application Serial No. PCT/US2017/049697, International Search Report dated Dec. 11, 2017", 3 pgs.
"International Application Serial No. PCT/US2017/049697, Written Opinion dated Dec. 11, 2017", 12 pgs.

* cited by examiner

*Primary Examiner* — Chieh M Fan
*Assistant Examiner* — Fitwi Hailegiorgis
(74) *Attorney, Agent, or Firm* — Schwegman Lundberg & Woessner, P.A.

(57) ABSTRACT

Some embodiments include apparatus and methods using a first latch in a decision feedback equalizer (DFE), a second latch in the DFE, and circuitry coupled to the first and second latches. The second latch includes a first input node coupled to an output node of the first latch. The circuitry includes a first input node coupled to the first output node, a second input node coupled to a second output node of the second latch, and an output node to provide information having a first output value based on first values of information at the first and second output nodes and a second output value based on second values of information at the first and second output nodes.

12 Claims, 4 Drawing Sheets

220

300

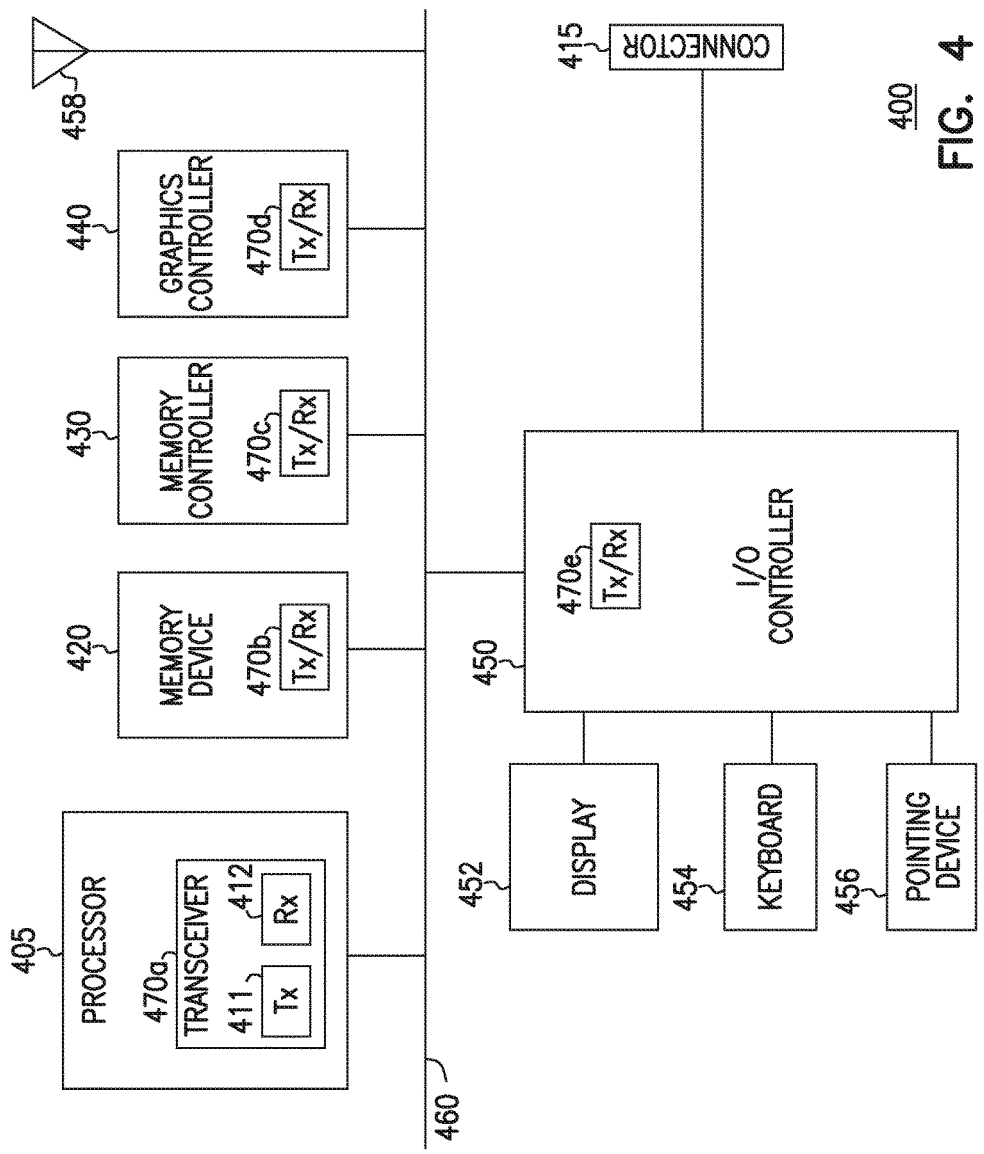

SUPPLY VOLTAGE ADAPTATION VIA DECISION FEEDBACK EQUALIZER

TECHNICAL FIELD

Embodiments described herein pertain to receiver circuitry. Some embodiments relate to equalizers in receivers.

BACKGROUND

Many electronic devices or systems, such as computers, tablets, and cellular phones, include receivers to receive signals. The signals carry information (e.g., data) transmitted from one device to another device. Equalizers are usually used to improve the quality of the signals received at the receiver. A decision feedback equalizer (DFE) is one type of equalizer. Some DFEs may have strict operational parameters such as DFE timing margins. In some cases, designing such DFEs may pose a challenge.

BRIEF DESCRIPTION OF THE DRAWINGS

FIG. 4 shows an apparatus in the form of an electronic system, according to some embodiments described herein.

DETAILED DESCRIPTION

Some techniques described herein provide a direct means to gauge the critical timing path of a DFE by configuring a portion (e.g., core circuit) of the DFE as a frequency divider. By observing the function (e.g., speed) of the frequency divider, the supply voltage (e.g., Vcc) of the DFE core logic can be adjusted to allow an optimal timing margin without consuming unnecessary current. The described techniques allow on-the-fly adaptation of the supply voltage, and allow the supply voltage to be adapted to accommodate process skew and device aging.

Some feedback paths in a loop-unroll DFE are often designed to be fast enough to ensure a sufficient timing margin for the loop unroll to operate correctly. In some DFE structures, designing part of the DFE to allow a great enough timing margin may be difficult. Further, variations in process, voltage, and temperature can make it very challenging to meet the timing constraints in the DFE circuit logic without sacrificing power efficiency. For example, the most significant timing challenge is usually at slow process skew and low Vcc, whereas fast skew corners typically provide a large timing margin, but the relatively higher current at fast skew corners may create self-heat and reliability issues.

The adaptive supply adaptation for DFE circuits in the techniques described herein may help relax the timing and reliability conflict. Further, the described techniques may allow the supply voltage for the entire forward path of the DFE to be tuned according to DFE timing needs.

Figure 1:
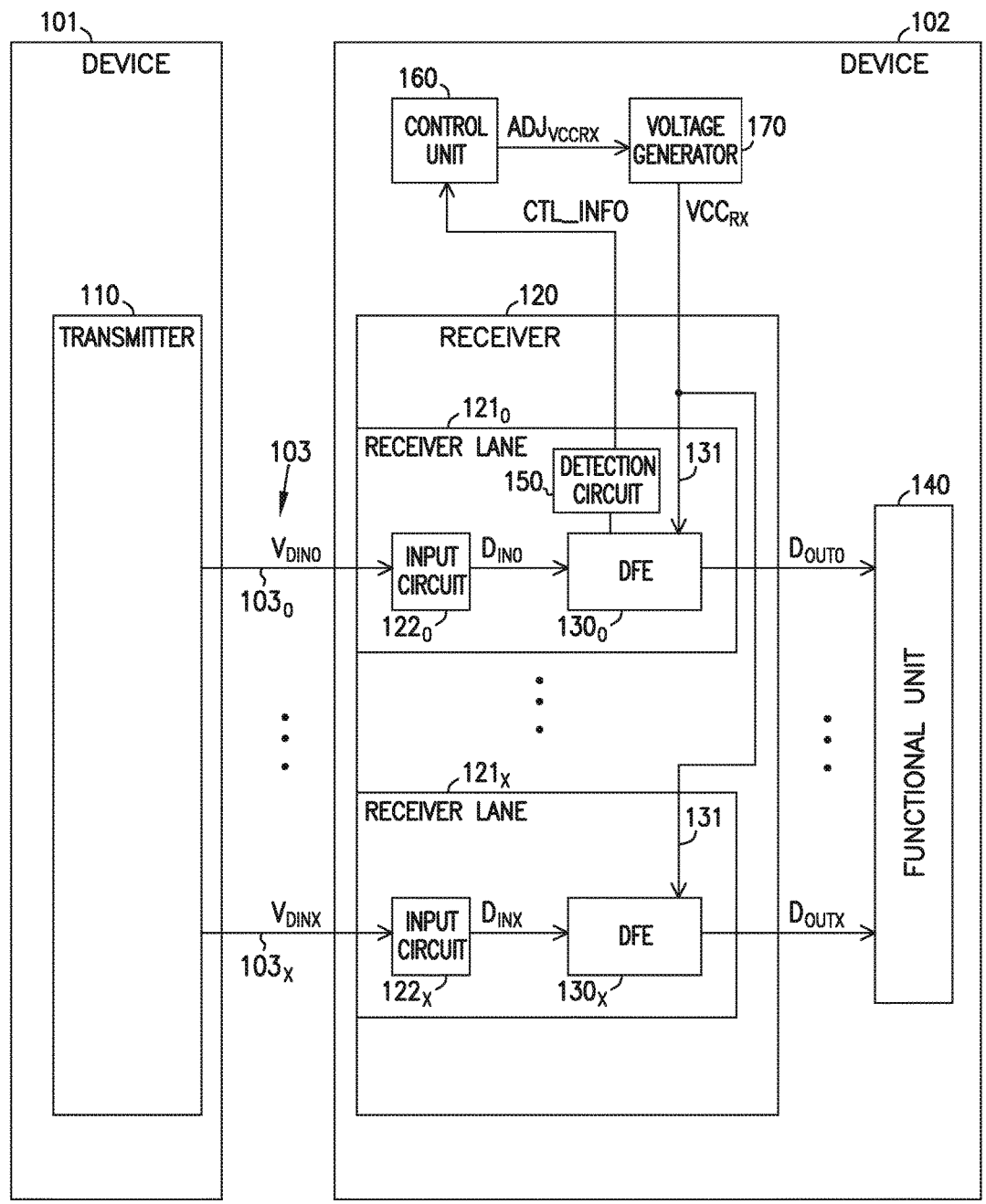
FIG. 1 shows an apparatus including devices and a channel between the devices, according to some embodiments described herein.

FIG. 1 shows apparatus 100 including devices 101 and 102, and channel 103 between devices 101 and 102, according to some embodiments described herein. Apparatus 100 can include or be included in an electronic device or system, such as a computer (e.g., server, desktop, laptop, or notebook), a tablet, a cellular phone, or other electronic devices or systems. Device 101 can include or be included in (e.g., formed in or formed on) an integrated circuit (IC) die (e.g., a semiconductor die or an IC chip). Device 102 can include or be included in (e.g., formed in or formed on) an IC die that can be different from or the same as the IC of device 101. Apparatus 100 can include or be included in a system-on-chip (SoC), such that device 101, 102, or both can be included (e.g., integrated) in the SoC. Devices 101 and 102 can include a combination of a controller (e.g., processors (e.g., central processing unit (CPU)), input/output controllers, or memory controllers), a memory device, or other electronic devices.

Devices 101 and 102 can include transmitter 110 and receiver 120, respectively. Channel 103 can provide communication (e.g., in the form of signal transmission) between devices 101 and 102. Channel 103 can include lanes (e.g., links) $103_0$ through $103_X$ to conduct signals between devices 101 and 102. Each of lanes $103_0$ through $103_X$ can be used to carry a single-ended signal or alternatively a differential pair signal. Each of lanes $103_0$ through $103_X$ can include a single conductive line (or alternatively multiple conductive lines), such as metal-based traces of a bus on a circuit board (e.g., printed circuit board of an electronic system) where devices 101 and 102 are located. In an alternative arrangement, channel 103 does not have to include conductive lines on a circuit board. For example, channel 103 can include a medium (e.g., air) for wireless communication between devices 101 and 102. Devices 101 and 102 may communicate with each other using signals at a relatively high frequency (up to 32 GHz (gigahertz) or higher per lane).

As shown in FIG. 1, transmitter 110 may transmit signals $V_{DIN0}$ through $V_{DINX}$ to receiver 120 on lanes $103_0$ through $103_X$, respectively. Each of signals $V_{DIN0}$ through $V_{DINX}$ can include a single-ended signal or a differential signal. Receiver 120 can generate signals $D_{OUT0}$ through $D_{OUTX}$. A functional unit 140 of device 102 may receive signals $D_{OUT0}$ through $D_{OUTX}$ for further processing. Examples of functional unit 140 include part of a processing core (e.g., CPU), part of a memory unit, or other types of functional units.

As shown in FIG. 1, receiver 120 can include receiver lanes $121_0$ through $121_X$. Each of receiver lanes $121_0$ through $121_X$ can perform an equalization operation on a respective analog input signal to generate a respective digital output signal (e.g., bits of information). For example, receiver lane $121_0$ can generate signal (e.g., output signal) $D_{OUT0}$ based on signal (e.g., input signal) $V_{DIN0}$. Receiver lane $121_X$ can generate signal (e.g., output signal) $D_{OUTX}$ based on signal (e.g., input signal) $V_{DINX}$. Each of signals $D_{OUT0}$ and $D_{OUTX}$ can be a digital signal that carries bits (e.g., data bits). FIG. 1 shows an example where receiver 120 includes two receiver lanes. The number of receiver lanes in receiver 120 may vary.

As shown in FIG. 1, receiver lane 1210 can include input circuit $122_0$ (which can include a continuous time linear equalizer (CTLE)), and DFE $130_0$. Input circuit $122_0$ can perform an equalization operation (e.g., a CTLE operation) to equalize (e.g., reduce noise in) signal $V_{DIN0}$ and generate signal (e.g., equalized signal) $D_{IN0}$. DFE $130_0$ can perform an equalization operation (e.g., DFE operation) on signal $D_{IN0}$ and generate signal $D_{OUT0}$. In a similar arrangement, receiver lane $121_X$ can include input circuit $122_X$ and DFE $130_X$. Similar to receiver lane $121_0$, receiver lane $121_X$ can operate to receive signal $V_{DINX}$ and generate signal $D_{INX}$ and signal $D_{OUTX}$.

As shown in FIG. 1, receiver 120 can include detection circuitry 150, control unit 160, and voltage generator 170. Voltage generator 170 can generate a voltage $VCC_{RX}$ and provide it to receiver 120. Receiver 120 may use voltage $VCC_{RX}$ as its supply voltage. For example, each of DFE $130_0$ and DFE $130_X$ can include supply node 131 to receive voltage $VCC_{RX}$. Each of DFE $130_0$ and DFE $130_X$ can use voltage $VCC_{RX}$ as a supply voltage for its components (e.g., data samplers, multiplexors, and latches, not shown in FIG. 1). The value of voltage $VCC_{RX}$ can be based on a value of information $ADJ_{VCCRX}$ generated by control unit 160. For example, voltage $VCC_{RX}$ can have one value based on a value of information $ADJ_{VCCRX}$ and another value based on another value of information $ADJ_{VCCRX}$.

Detection circuitry 150 can operate to receive monitor) some signals in DFE $130_0$ and generate information (e.g., control information) CTL_INFO. Information CTL_INFO can include digital information. The value of information CTL_INFO depends on the condition of the signals being monitored by detection circuitry 150. For example, information CTL_INFO can have one value if DFE $130_0$ operates within expected operating parameters and another value if DFE $130_0$ operates outside the expected operating parameters. The operating parameters can include a timing margin, a value of a supply voltage (e.g., voltage $VCC_{RX}$), and other operating parameters of DFE $130_0$.

Control unit 160 can operate to generate information $ADJ_{VCCRX}$ based on the value of information CTL_INFO. Information $ADJ_{VCCRX}$ can include digital information. In some situations (e.g., in a particular mode of operation), DFE $130_0$, DFE $130_X$, or both may operate outside expected operating parameters that may potentially cause receiver 120 to fail. Control unit 160 can adjust the value of information $ADJ_{VCCRX}$ in order to cause voltage generator 170 to change (e.g., decrease or increase) the value of voltage $VCC_{RX}$. Changing (adjusting) the value of voltage $VCC_{RX}$ may allow the components of receiver 120 (e.g., components of DFE $130_0$, DFE $130_X$, or both) to operate properly (e.g., within a timing margin).

Thus, as described above, detection circuitry 150, control unit 160, and voltage generator 170 may form a control loop to adjust voltage $VCC_{RX}$ in DFE $130_0$ and DFE $130_X$. As an example, device 102 may adjust the value of voltage $VCC_{RX}$ in order to keep DFE $130_0$ and DFE $130_X$ operating within their timing margins (as described in more detail with reference to FIG. 2 and FIG. 3).

Figure 2:
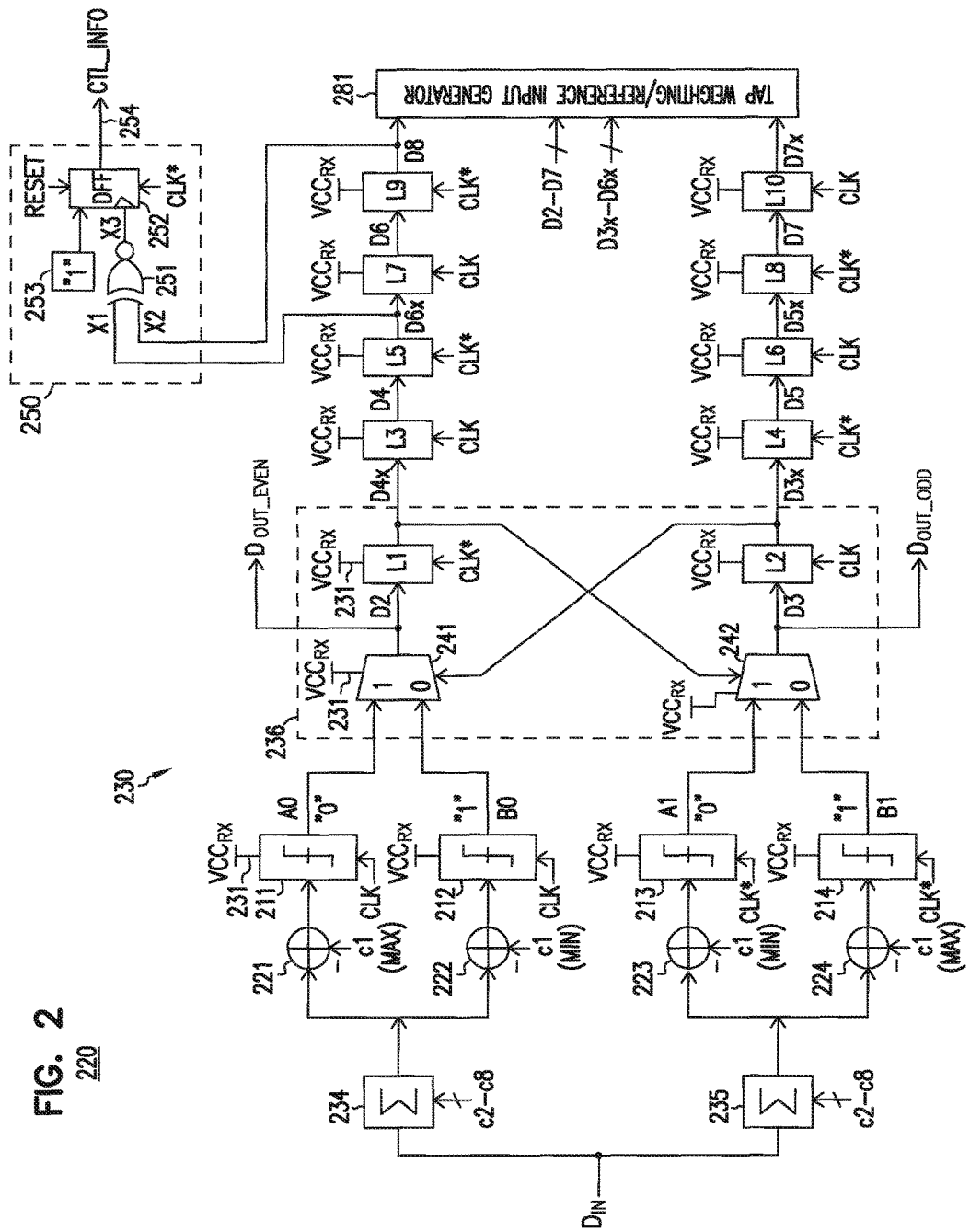
FIG. 2 shows a block diagram of a receiver including a DFE and a detection circuitry, according to some embodiments described herein.

FIG. 2 shows a block diagram of a receiver 220 including a DFE 230 and a detection circuitry 250, according to some embodiments described herein. Receiver 220 can correspond to receiver 120 of FIG. 1. As shown in FIG. 2, receiver 220 can receive a signal (e.g., input signal) $D_{IN}$ and generate signals output signals) $D_{OUT\_EVEN}$ and $D_{OUT\_ODD}$ based on signal $D_{IN}$. Signal $D_{IN}$ can correspond to signal $D_{IN0}$ of FIG. 1, and the combination of $D_{OUT\_EVEN}$ and $D_{OUT\_ODD}$ can correspond to signal Douro of FIG. 1. In FIG. 2, DFE 230 may provide signal $D_{OUT\_EVEN}$ and $D_{OUT\_ODD}$ to another unit (e.g., functional unit 140 of FIG. 1) for further processing.

As shown in FIG. 2, receiver 220 can include data samplers (e.g., slicers or comparators) 211, 212, 213, and 214, multiplexors 241 and 242, latches (e.g., data latches) L1 through L10, circuit 281 (e.g., tap weighting and reference input generator), summers 234 and 235, and summers 221, 222, 223, and 224. DFE 230 can include nodes (e.g., supply node) 231 to receive voltage $VCC_{RX}$, which can be used as a supply voltage for some of the components (as shown in FIG. 2) of DFE 230. Voltage $VCC_{RX}$ can be generated by a voltage generator, such as voltage generator 170 of FIG. 1.

Summers 234 and 235 can be part of even and odd data paths, respectively, of DFE 230. The components of DFE 230 can operate using clock signals CLK and CLK* (complementary clock signals) as shown in FIG. 2. Each of clock signals CLK and CLK* can have a frequency equal to one-half of the frequency of signal $D_{IN}$. Each of summer 234 and 235 can receive reference inputs c2-c8, which can be generated by circuit 281 based on outputs (e.g., signals D2 through D7 and. D3x through D6x) of respective multiplexor 241, multiplexor 242, and latches L1 through L10. Data samplers 211, 212, 213, and 214 can receive signals from outputs of summers 221, 222, 223, and 224, respectively. Summers 221, 222, 223, and 224 can receive associated reference inputs c1, FIG. 2 shows summers 221, 222, 223, and 224 as separate elements from respective data samplers 211, 212, 213, and 214 to help focus on some features described herein. However, summing actions associated with summers 221, 222, 223, and 224 can be implemented as sampler offsets of data samplers 211, 212, 213, and 214, respectively. With the configuration shown in FIG. 2, DFE 230 is configured as a 1-tap loop-unroll DFE with a timing constraint of 2UI (two unit intervals) for most of its critical path.

DFE 230 can operate in different operating modes, which can include a normal operating mode and an adjustment mode (e.g., a mode to adjust supply voltage (e.g., $VCC_{RX}$ of INT 230)). DFE 230 can be placed (can be switched between modes) in the normal mode or the adjustment mode by a control unit (not shown in FIG. 2, but, e.g., similar to control unit 160 of FIG. 1). Such a control unit can be part of receiver 220 or part of a device (e.g., device 102. in FIG. 1) that includes receiver 220.

Some of the signals of DFE 230 can be provided with different values depending on whether DFE 230 is in the normal operating mode or the adjustment mode. For example, reference inputs c1 at respective inputs of summers 221, 222, 223, and 224 can be provided with one set of values in the normal mode and another set of values in the adjustment mode. In FIG. 2, a set of values MIN (minimum value for c1) and MAX (maximum value for c1) at respective reference inputs c1 are the set of values that can be used during the adjustment mode of DFE 230. After the adjustment mode, reference inputs c1 can be provided with normal values (different from the minimum and maximum values) for normal operations of DFE 230. The normal values can be based on characteristics of the channel (e.g., channel 103) on which DFE 230 is designed to operate.

The following description gives an explanation for providing values MIN and MAX to respective reference inputs cl during the adjustment mode. As shown in FIG. 2, multiplexor 241, latch L1, multiplexor 242, and latch L2 (DFE loop unroll path) can be configured as frequency divider (divided-by-2 frequency divider) 236. This can be achieved by providing respective reference inputs c1 with MIN and MAX values (as shown in FIG. 2.) in order to cause (e.g., to force) data samplers 211, 212, 213, and 214 to generate static outputs, such that the value of outputs A0, B0, A1, and B1 of data samplers 211, 212, 213, and 214, respectively, are A0=0, B0=1, A1=1, and B1=0 (binary 0 and binary 1). FIG. 2 shows an example where reference inputs cl have respective MIN and MAX values as shown in FIG. 2. However, the values MIN and MAX can be reversed. For example, value MIN can be provided to summers 221 and 224 and value MAX can be provided to summer 222 and 223.

With the configuration shown in FIG. 2 (static pattern 0101), multiplexor 241 is equivalent to an inverter, multiplexor 242 is equivalent to a buffer, and frequency divider 236 can operate properly if operating parameters of DFE 230 remain unchanged (e.g., if the loop unroll path has a sufficient timing margin). However, frequency divider 236 may malfunction if the values of such parameters significantly change (e.g., if the loop unroll path has an insufficient timing margin) or if the values of such parameters are improperly selected (e.g., improperly selected during initial settings or during calibration of DFE 230. Since frequency divider 236 is configured from components (e.g., multiplexor 241, latch L1, multiplexor 242, and latch L2) of DFE 230, the malfunctioning of frequency divider 236 also means a malfunctioning of DFE 230. Thus, by placing DFE 230 in the adjustment mode and then monitoring the function of frequency divider 236, information (e.g., information CTL_INFO) based on the function of frequency divider 236 can be obtained. The information can be used to set (or alternatively to adjust) values for parameters of DFE 230 to maintain proper operation of DFE 230.

As an example, in the adjustment mode, if frequency divider 236 is determined to be functioning properly, then the value of voltage $VCC_{RX}$ may be kept the same or may be decreased (e.g., to save power) to a value that causes no malfunctioning of frequency divider 236. In this example, if frequency divider 236 malfunctions, then the value of voltage $VCC_{RX}$ may be adjusted until frequency divider 236 functions properly. As described above, the value of information CTL_INFO can be used to determine whether frequency divider 236 functions properly. Information CTL_INFO can be generated by detection circuitry 250.

As shown in FIG. 2, detection circuitry 250 can include input nodes coupled to output nodes of two respective latches (e.g., L5 and L9), logic circuit (e.g., exclusive NOR (XNOR) gate) 251, and flip flop (e.g., D-type flip flop (DFF)) 252 that can be reset by a reset signal RESET and can receive input data 253 having a value remaining at "1". Detection circuitry 250 can include an output node 254 to provide information (e.g., control information) CTL_INFO. Information CTL_INFO can be a single bit (or alternatively multiple bits). FIG. 2 shows an example where detection circuitry 250 is coupled to output nodes of latches L5 and L9. However, a different pair of latches among latches L1 through L10 can be used. For example, detection circuitry 250 can be coupled to output nodes of latches L1 and L5, or L3 and L7. In another example, detection circuitry 250 can be coupled to output nodes of latches L2 and L6, L4 and L8, or L6 and L10.

In the adjustment mode, logic circuit 251 of detection circuitry 250 can operate to detect whether frequency divider 236 functions as a by-2 divider. If frequency divider 236 functions as a by-2 divider, information X1 and X2 at input nodes of logic circuit (XNOR gate) 251 have opposite values (e.g., "0" and "1"). Thus, information X3 at the output node of logic circuit 251 will have a static value of "0" (output value). The value of information X3 remains at "0" and the value of information CTL_INFO also remains at "0" as long as frequency divider 236 properly functions as a by-2 divider. Thus, frequency divider 236 can be determined to function properly as long as the output nodes of the pair of latches (e.g., latches L5 and L9) coupled to detection circuitry 250 provide a pattern of "0101" (or alternatively, pattern "1010"). As mentioned above, DFE 230 is configured as a 1-tap loop-unroll DFE with a timing constrain of 2UI. Thus, if the delay (time delay) of the path that includes multiplexor 241, latch L1, multiplexor 242, and latch L2 is greater than 2UI, frequency divider 236 can malfunction. When this occurs, the values of information X1 and X2 can be the same (e.g., X1=X2="0" or X1=X2="1"). This causes the value of information X3 to change from "0" to "1". Thus, the value of information CTL_INFO (normally at "0") can also change from "0" to "1" (e.g., change from one output value (e.g., "0") to another output value (e.g., "1")). The change in the value (output value) of information CTL_INFO (e.g., from "0" to "1") can be used to indicate that frequency divider 236 has failed to operate as a by-2 divider. Thus, frequency divider 236 may fail to operate as a by-2 divider when the output nodes of the pair of latches (e.g., latches L5 and L9) coupled to detection circuitry 250 fail to provide a pattern of "0101" (or alternatively, fail to provide pattern "1010").

Thus, as described above, detection circuitry 250 can operate to detect whether a pattern of "0101" (or alternatively "1010") are provided at output nodes of a pair of latches of DFE 230. The pattern ("0101" or alternatively, pattern "1010") can be used as an indication of whether frequency divider 236 functions properly. As described above, the values of some parameters of DFE 230 (e.g., voltage $VCC_{RX}$) can be adjusted until frequency divider 236 functions properly. FIG. 2 shows detection circuitry 250 having specific elements that include logic gate 251, flip-flop 252, and data input 253 as an example. However, detection circuitry 250 can have different elements as long as such elements can detect whether a pattern of opposite values (e.g., "0101" or "1010") from a pair of latches of DFE 230 is present (this means that frequency divider 236 functions properly) or not present (this means that frequency divider 236 has failed).

As described above, receiver 220 or a device that includes receiver can include a control unit similar to control unit 160 of FIG. 1. The control unit can cause a voltage generator (which provides voltage $VCC_{RX}$ to nodes 231 of receiver 220) to change (e.g., decrease or increase) the value of voltage $VCC_{RX}$. Changing (adjusting) the value of voltage $VCC_{RX}$ may allow frequency divider 236 to function properly. DFE 230 can exit the adjustment mode and switch to the normal mode after frequency divider 236 functions properly.

Figure 3:
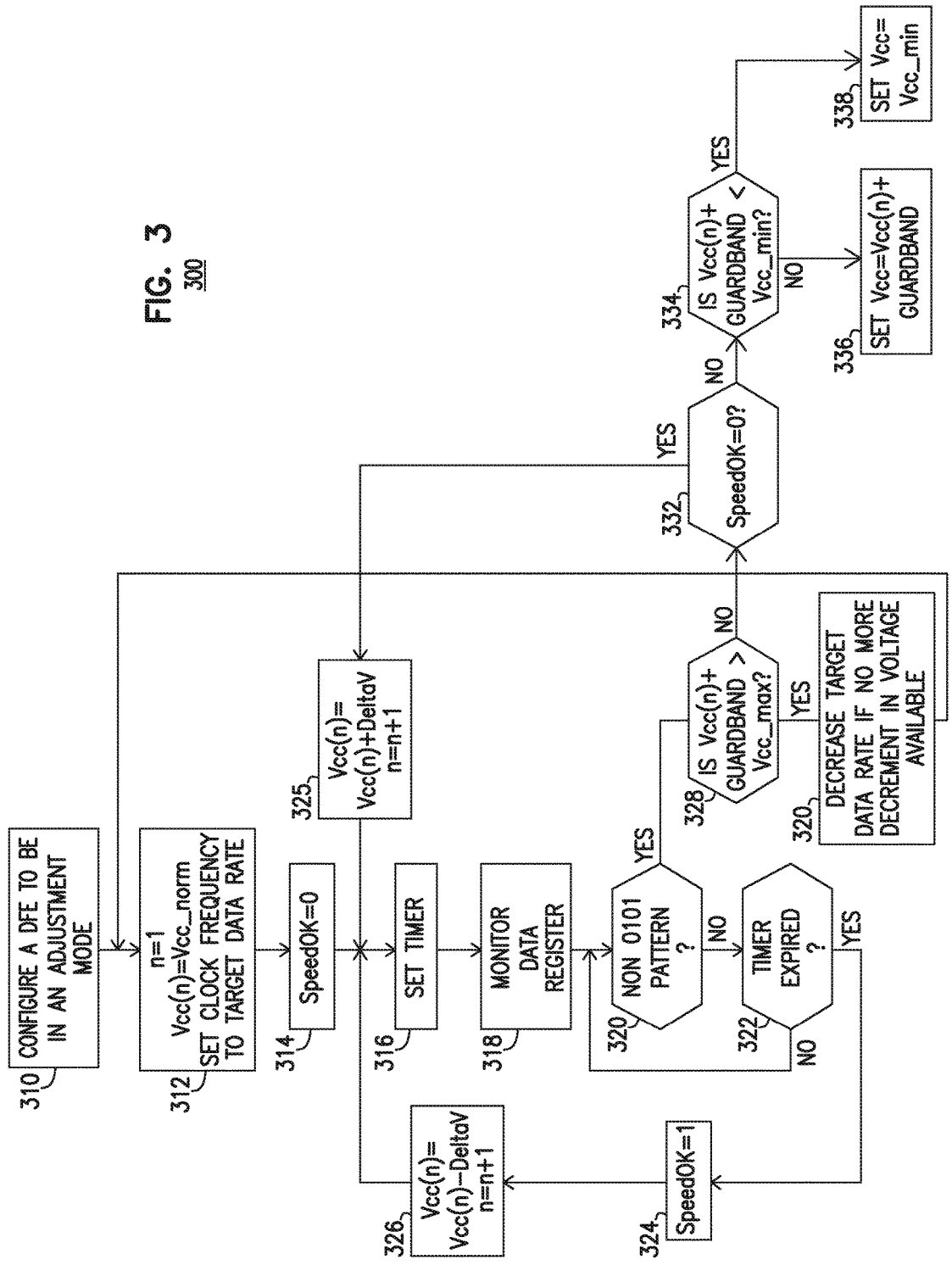
FIG. 3 is a flowchart showing a method of operating a receiver, according to some embodiments described herein.

FIG. 3 is a flowchart showing a method 300 of operating a DFE of a receiver, according to some embodiments described herein. The DFE and the receiver used in method 300 can include any of the DFEs and receivers described above with reference to FIG. 1 and FIG. 2. Some of the activities in method 300 may be performed by hardware, software, firmware, or any combination of hardware, software, and firmware. Such hardware, software, and firmware can be included in the receiver or in the device or system that includes the receiver.

As described in more detail below, method 300 can include activities to adjust and set a value of a voltage (e.g., supply voltage) Vcc based on the operation of a frequency divider of the DFE. Method 300 may start with a voltage Vcc_norm, which is approximately a midpoint between the values of voltages Vcc_min and Vcc_max. Voltages Vcc_min and Vcc_max can be the minimum and maximum operating voltages, respectively, of the DFE. Based on the function of the frequency divider, method 300 can increase or decrease the value of voltage Vcc(n) until a final (e.g., optimal) value of Vcc(n) is reached. Voltage Vcc(n) is voltage of Vcc during a particular $n^{th}$ iteration of method 300. After a final value of Vcc(n) is reached, method 300 can set the final value as the value for the supply voltage for the DFE.

As shown in FIG. 3, activity 310 can include configuring the DFE to operate in an adjustment mode (e.g., a frequency divider mode). For example, reference inputs c1 at respective inputs of summers (e.g., summers 221, 222, 223, and 224) can be provided with values MIN (minimum value for c1) and MAX (maximum value for c1). Activity 312 can include setting (e.g., initializing) a count value n to be one (n=1), voltage Vcc(n) to be voltage Vcc_norm, and a clock frequency (e.g., frequency of clock signals CLK and CLK* in FIG. 2) to a target frequency. As mentioned above, voltage Vcc_norm can have a value of approximately a midpoint between the values of voltages Vcc_min and Vcc_max (a range for the supply voltage of the DFE). Activity 314 can include setting a variable SpeedOk=0. Activity 316 can include setting a timer to a predetermined value.

Method 300 can continue with activity 318, which can include monitoring values in data registers. These values can be provided from the output of the frequency divider of the DFE (e.g., from four consecutive bits at the output node of latch L2 in FIG. 2). Activity 320 of method 300 can include determining whether the bits in the data registers follow a 0101 pattern. If the pattern remains valid (the 0101 pattern is confirmed), method 300 can continue with activity 322 to determine whether the timer (set in activity 316) has expired. If the timer is not expired, method 300 can go back to activity 320 to keep determining whether the bits in the data registers follow the 0101 pattern. If the timer is expired, method 300 can continue with activity 324, which includes updating the value of SpeedOk to "1", and move to activity 326. Activity 326 can include decreasing the value of Vcc(n) by an amount delta V($\Delta$V), and increasing the value of n by one (n=n+1). Method 300 can then repeat activities 316, 318, and 320. At activity 320, if the 0101 pattern is confirmed (is true), method 300 can repeat the activities described above. If the 0101 pattern is not confirmed (not true), method 300 can continue with activity 328, which includes determining whether Vcc(n)+guardband>Vcc_max. Guardband is an amount of voltage to allow the frequency divider (e.g., frequency divider 236 of FIG. 2) to have a sufficient timing margin. In activity 328, if Vcc(n)+guardband>Vcc_max is true, then method 300 can continue with activity 330, which can include decreasing the target data rate if no more decrement in voltage Vcc is available. Method 300 can go back to activity 312 and repeat some or all of the activities described above.

In activity 328, if Vcc(n)+guardband>Vcc_max is not true, then method 300 can continue with activity 332. Activity 322 can include determining whether SpeedOk=0. If SpeedOk=0 is true, then method 300 can continue with activity 325, which can include increasing the value of Vcc(n) by an amount delta V, and increasing the value of n by one (n=n+1). Then, method 300 can continue with activity 316 and other activities described above. In activity 332, if SpeedOK=0 is not true, then method 300 can continue with activity 334, which can include determining whether Vcc(n)+guardband<Vcc_min. If Vcc(n)+guardband<Vcc_min is not true, then method 300 can continue with activity 336, which can include setting the value of Vcc (e.g., the supply voltage of the DFE) to be the value of Vcc(n)+guardband. Method 300 may end (e.g., exit the adjustment mode) after activity 336. In activity 334, if Vcc(n)+guardband<Vcc_min is true, then method 300 can continue with activity 338, which can include setting the value of Vcc to be the value of Vcc_min, Method 300 may end (e.g., exit the adjustment mode) after activity 338.

Method 300 can include fewer or more activities relative to the activities shown in FIG. 3. For example, method 300 can include activities and operations of receivers including DFEs described above with reference to FIG. 1 and FIG. 2.

FIG. 4 shows an apparatus in the form of a system (e.g., electronic system) 400, according to some embodiments described herein. System 400 can include or be included in a computer, a tablet, or other electronic systems. As shown in FIG. 4, system 400 can include components, such as a processor 405, a memory device 420, a memory controller 430, a graphics controller 440, an input and output (I/O) controller 450, a display 452, a keyboard 454, a pointing device 456, at least one antenna 458, a connector 415, and a bus 460. Bus 460 can include conductive lines (e.g., metal-based traces on a circuit board where the components of system 400 are located).

In some arrangements, system 400 does not have to include a display. Thus, display 452 can be omitted from system 400. In some arrangements, system 400 does not have to include any antenna 458. Thus, antenna 458 can be omitted from system 400.

Processor 405 can include a general-purpose processor or an application specific integrated circuit (ASIC). Processor 405 can include a CPU.

Memory device 420 can include a dynamic random-access memory (DRAM) device, a static random-access memory (SRAM) device, a flash memory device, phase change memory, a combination of these memory devices, or other types of memory. FIG. 4 shows an example where memory device 420 is a stand-alone memory device separated from processor 405. In an alternative arrangement, memory device 420 and processor 405 can be located on the same die. In such an alternative arrangement, memory device 420 is an embedded memory in processor 405, such as embedded DRAM (eDRAM), embedded SRAM (eSRAM), embedded flash memory, or another type of embedded memory.

Display 452 can include a liquid crystal display (LCD), a touchscreen (e.g., capacitive or resistive touchscreen), or another type of display. Pointing device 456 can include a mouse, a stylus, or another type of pointing device.

I/O controller 450 can include a communication module for wired or wireless communication (e.g., communication through one or more antennas 458). Such wireless communication may include communication in accordance with WiFi communication technique, Long Term Evolution Advanced (LTE-A) communication technique, or other communication techniques.

I/O controller 450 can also include a module to allow system 400 to communicate with other devices or systems in accordance with one or more standards or specifications (e.g., I/O standards or specifications), including Universal Serial Bus (USB), DisplayPort (DP), High-Definition Multimedia Interface (HDMI), Thunderbolt, Peripheral Component Interconnect Express (PCIe), and other specifications.

Connector 415 can be arranged (e.g., can include terminals, such as pins) to allow system 400 to be coupled to an external device (or system). This may allow system 400 to communicate (e.g., exchange information) with such a device (or system) through connector 415.

Connector 415 and at least a portion of bus 460 can include conductive lines that conform with at least one of USB, DP, HDMI, Thunderbolt, PCIe, and other specifications.

As shown in FIG. 4, processor 405 can include transceiver (Tx/Rx) 470a having transmitter (Tx) 411 and receiver (Rx) 412. Transmitter 411 can operate to transmit information from processor 405 to another part of system 400 or to an external device (or system) coupled to connector 415.

Receiver 412 of processor 405 can operate to receive information from another part of system 400 or from an external device (or system) coupled to connector 415. For example, receiver 412 can receive information (e.g., data and clock signals) from one or more of memory device 420, memory controller 430, graphics controller 440, and I/O controller 450. Receiver 412 can include components and perform operations of any of the receivers and any of the DFEs described above with reference to FIG. 1 through FIG. 3.

As shown in FIG. 4, memory device 420, memory controller 430, graphics controller 440, and I/O controller 450 can include transceivers 470b, 470c, 470d, and 470e, respectively, to allow each of these components to transmit and receive information through their respective transceiver. At least one of transceivers 470b, 470c, 470d, and 470e can be similar to or identical to transceiver 470a. Thus, at least one of transceivers 470b, 470c, 470d, and 470e can include a receiver similar to or identical to receiver 412. For example, at least one of transceivers 470b, 470c, 470d, and 470e can include a receiver that can be arranged to allow at least one of memory device 420, memory controller 430, graphics controller 440, and I/O controller 450 to receive information (e.g., data and clock signals) from another part of system 400 or from an external device (or system) coupled to connector 415.

FIG. 4 shows the components of system 400 arranged separately from each other as an example. For example, each of processor 405, memory device 420, memory controller 430, graphics controller 440, and I/O controller 450 can be located on a separate IC (e.g., semiconductor die or IC chip). In some arrangements, two or more components (e.g., processor 405, memory device 420, graphics controller 440, and I/O controller 450) of system 400 can be located on the same die (e.g., same IC chip) that forms a system-on-chip (SoC).

The illustrations of the apparatuses (e.g., apparatus 100 including receiver 120, and receiver 220 including DFE 230, and system 400) and methods (e.g., method 300 and operations of receiver 120, receiver 220 and DFE 230, and system 400) described above are intended to provide a general understanding of the structure of different embodiments and are not intended to provide a complete description of all the elements and features of an apparatus that might make use of the structures described herein.

The apparatuses and methods described above can include or be included in high-speed computers, communication and signal processing circuitry, single-processor modules or multi-processor modules, single embedded processors or multiple embedded processors, multi-core processors, message information switches, and application-specific modules including multilayer or multi-chip modules. Such apparatuses may further be included as sub-components within a variety of other apparatuses (e.g., electronic systems), such as televisions, cellular telephones, personal computers (e.g., laptop computers, desktop computers, handheld computers, etc.), tablets (e.g., tablet computers), workstations, radios, video players, audio players (e.g., MP3 (Motion Picture Experts Group, Audio Layer 3) players), vehicles, medical devices (e.g., heart monitors, blood pressure monitors, etc.), set top boxes, and others.

ADDITIONAL NOTES AND EXAMPLES

Example 1 includes subject matter (such as a device, an electronic apparatus (e.g., circuit, electronic system, or both), or a machine) including a first latch in a decision feedback equalizer (DFE), a second latch in the DFE, the second latch including an input node coupled to a first output node of the first latch; and circuitry including a first input node coupled to the first output node, a second input node coupled to a second output node of the second latch, and an output node to provide information having a first output value based on first values of information at the first and second output nodes and a second output value based on second values of information at the first and second output nodes.

In Example 2, the subject matter of Example 1 may optionally include, wherein the output node of the circuitry is to provide information having the first output value if information at the first output node and information at the second output node have a same value, and the second output value if information at the first output node and information at the second output node have different values.

In Example 3, the subject matter of Example 1 or 2 may optionally include, wherein the DFE includes a first data sampler and a second data sampler, a first multiplexor coupled to an output node of each of the first and second data samplers, the first multiplexor including an output node coupled to the first latch through a first signal path, a third data sampler and a fourth data sampler, and a second multiplexor coupled to an output node of each of the third and fourth data samplers, the second multiplexor including an output node coupled to the second latch through a second signal path.

In Example 4, the subject matter of Example 1 or 2 may optionally include, wherein the first output value is a binary 0 and the second output value is a binary 1.

In Example 5, the subject matter of Example 1 may optionally include, wherein the circuitry includes a logic gate, the logic gate including a first input node coupled to the output node of the first latch, and a second input node coupled to an output node of the second latch.

In Example 6, the subject matter of Example 5 may optionally include, wherein the logic gate includes an exclusive-NOR gate.

Example 7 includes subject matter (such as a device, an electronic apparatus (e.g., circuit, electronic system, or both), or a machine) including a supply node, and a decision feedback equalizer (DFE) coupled to the supply node, the DFE including data samplers, a first multiplexor and a second multiplexor coupled to the data samplers, and a first latch and a second latch coupled to the first and second multiplexors, the data samplers to generate outputs having values to allow the first and second multiplexors and the first and second latches to form a frequency divider.

In Example 8, the subject matter of Example 7 may optionally include, further comprising a third latch in the DFE, a fourth latch in the DFE, the fourth latch including an input node coupled to an output node of the third latch, and a logic circuit including a first input node coupled to an output node of the third latch, and a second input node coupled to an output node of the fourth latch, In Example 9, the subject matter of Example 8 may optionally include, wherein the logic circuit is to generate the information to allow adjustment of a supply voltage at the supply node based on an operation of the frequency divider.

In Example 10, the subject matter of Example 9 may optionally include, wherein the logic circuit is to generate the information having a single bit.

Example 11 includes subject matter (such as a device, an electronic apparatus (e.g., circuit, electronic system, or both), or a machine) including a decision feedback equalizer (DFE) including a supply node to receive a supply voltage, detection circuitry to generate information based on at least one signal in the DFE, and a control unit to cause a value of the supply voltage to change based on a value of the information.

In Example 12, the subject matter of Example 11 may optionally include, wherein the DFE includes a portion configured to operate as a frequency divider, and the at least one signal in the DFE has a value based on an operation of the frequency divider.

In Example 13, the subject matter of Example 11 may optionally include, wherein the DFE includes a portion configured to operate as a frequency divider, wherein the value of the information generated by the detection circuitry is based on an operation of the frequency divider.

In Example 14, the subject matter of Example 12 may optionally include, wherein the portion of the DFE configured to operate as the frequency divider includes a first multiplexor, a first latch coupled to the first multiplexor, a second multiplexor coupled to the first latch, and a second latch coupled to the second multiplexor and the first multiplexor.

In Example 15, the subject matter of any of Examples 11-14 may optionally include, wherein the DFE includes a first latch and a second latch coupled in series with the first latch, and the detection circuitry is coupled to an output node of each of the first and second latches.

In Example 16, the subject matter of any of Examples 11-14 may optionally include, wherein the DFE is a 1-tap loop-unroll DFE.

Example 17 includes subject matter such as a device, an electronic apparatus (e.g., circuit, electronic system, or both), or a machine) including conductive lines on a circuit board, a first device coupled to the conductive lines, a second device coupled to the conductive lines, the second device including a decision feedback equalizer (DFE) coupled to a supply node, the DFE including, data samplers, a first multiplexor and a second multiplexor coupled to the data samplers, and a first latch and a second latch coupled to the first and second. multiplexors, the data samplers to generate outputs having values to allow the first and second multiplexors and the first and second latches to form a frequency divider, and a connector coupled to the second device.

In Example 18, the subject matter of Example 17 may optionally include, wherein the second device includes a processor.

In Example 19, the subject matter of Example 17 may optionally include, wherein the connector conforms with one of Universal Serial Bus (USB), High-Definition Multimedia Interface (HDMI), Thunderbolt, and Peripheral Component Interconnect Express (PCIe) specifications.

In Example 20, the subject matter of Example 17 may optionally include, further comprising an antenna coupled to the second device.

Example 21 includes subject matter (such as a method of operating a device, an electronic apparatus (e.g., circuit, electronic system, or both), or a machine) including causing a portion of a decision feedback equalizer (DFE) to operate as a frequency divider, monitoring information at output of latches of the DFE, and adjusting a value of a supply voltage of the DFE, based on the information.

In Example 22, the subject matter of Example 21 may optionally include, wherein causing a portion of the DFE to operate as a frequency divider includes forcing outputs of data sampler of the DFE to have a pattern of unchanged values.

In Example 23, the subject matter of Example 21 or 22 may optionally include, wherein the frequency divider is formed from multiplexors and latches of the DFE.

In Example 24, the subject matter of Example 21 may optionally include, wherein adjusting the value of the supply voltage of the DFE includes increasing the value of the supply voltage.

In Example 25, the subject matter of Example 21 may optionally include, wherein adjusting the value of the supply voltage of the DFE includes decreasing the value of the supply voltage.

Example 26 includes subject matter (such as a device, an electronic apparatus (e.g., circuit, electronic system, or both), or machine) including means for performing any of the methods of examples 21-25.

The subject matter of Example 1 through Example 25 may be combined in any combination.

The above description and the drawings illustrate some embodiments to enable those skilled in the art to practice the embodiments of the invention. Other embodiments may incorporate structural, logical, electrical, process, and other changes. Examples merely typify possible variations. Portions and features of some embodiments may be included in, or substituted for, those of other embodiments. Many other embodiments will be apparent to those of skill in the art upon reading and understanding the above description. Therefore, the scope of various embodiments is determined by the appended claims, along with the full range of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a supply node; and
   a decision feedback equalizer (DFE) coupled to the supply node, the DFE including:
   data samplers;
   a first multiplexor and a second multiplexor coupled to the data samplers, the data samplers including a first data sampler and a second data sampler, the first multiplexor including an input node directly coupled to the first data sampler, and the second multiplexor including an input node directly coupled to the second data sampler; and
   a first latch and a second latch, the first latch including an output node directly coupled to the first multiplexor, the second latch including an output node directly coupled to the second multiplexor, and the data samplers to generate outputs having values to allow the first and second multiplexors and the first and second latches to form a frequency divider.

2. The apparatus of claim 1, further comprising:
   a third latch in the DFE;
   a fourth latch in the DFE, the fourth latch including an input node coupled to an output node of the third latch; and
   a logic circuit including a first input node coupled to an output node of the third latch, and a second input node coupled to an output node of the fourth latch.

3. An apparatus comprising:
a supply node; and
a decision feedback equalizer (DFE) coupled to the supply node, the DFE including:
data samplers;
a first multiplexor and a second multiplexor coupled to the data samplers;
a first latch and a second latch coupled to the first and second multiplexors, the data samplers to generate outputs having values to allow the first and second multiplexors and the first and second latches to form a frequency divider;
a third latch in the DFE;
a fourth latch in the DFE, the fourth latch including an input node coupled to an output node of the third latch; and
a logic circuit including a first input node coupled to an output node of the third latch, and a second input node coupled to an output node of the fourth latch, wherein the logic circuit is to generate information to allow adjustment of a supply voltage at the supply node based on an operation of the frequency divider.

4. The apparatus of claim 3, wherein the logic circuit is to generate the information having a single bit.

5. An apparatus comprising:
a decision feedback equalizer (DFE) including a supply node to receive a supply voltage, the DFE including:
data samplers;
a first multiplexor and a second multiplexor coupled to the data samplers, the data samplers including a first data sampler and a second data sampler, the first multiplexor including an input node directly coupled to the first data sampler, and the second multiplexor including an input node directly coupled to the second data sampler; and
a first latch and a second latch, the first latch including an output node directly coupled to the first multiplexor, the second latch including an output node directly coupled to the second multiplexor, and the data samplers to generate outputs having values to allow the first and second multiplexors and the first and second latches to form a frequency divider;
detection circuitry to generate information based on at least one signal in the DFE; and
a control unit to cause a value of the supply voltage to change based on a value of the information.

6. The apparatus of claim 5, wherein the at least one signal in the DFE has a value based on an operation of the frequency divider.

7. The apparatus of claim 5, wherein the value of the information generated by the detection circuitry is based on an operation of the frequency divider.

8. The apparatus of claim 5, wherein the DFE is a 1-tap loop-unroll DFE.

9. An apparatus comprising:
conductive lines on a circuit board;
a first device coupled to the conductive lines;
a second device coupled to the conductive lines, the second device including:
a decision feedback equalizer (DFE) coupled to a supply node, the DFE including, data samplers, a first multiplexor and a second multiplexor coupled to the data samplers, and a first latch and a second latch coupled to the first and second multiplexors, the data samplers including a first data sampler and a second data sampler, the first multiplexor including an input node directly coupled to the first data sampler, the second multiplexor including an input node directly coupled to the second data sampler, the first latch including an output node directly coupled to the first multiplexor, the second latch including an output node directly coupled to the second multiplexor, and the data samplers to generate outputs having values to allow the first and second multiplexors and the first and second latches to form a frequency divider; and
a connector coupled to the second device.

10. The apparatus of claim 9, wherein the second device includes a processor.

11. The apparatus of claim 9, wherein the connector conforms with one of Universal Serial Bus (USB), High-Definition Multimedia Interface (HDMI), Thunderbolt, and Peripheral Component Interconnect Express (PCIe) specifications.

12. The apparatus of claim 9, further comprising an antenna coupled to the second device.

* * * * *